2,143,238

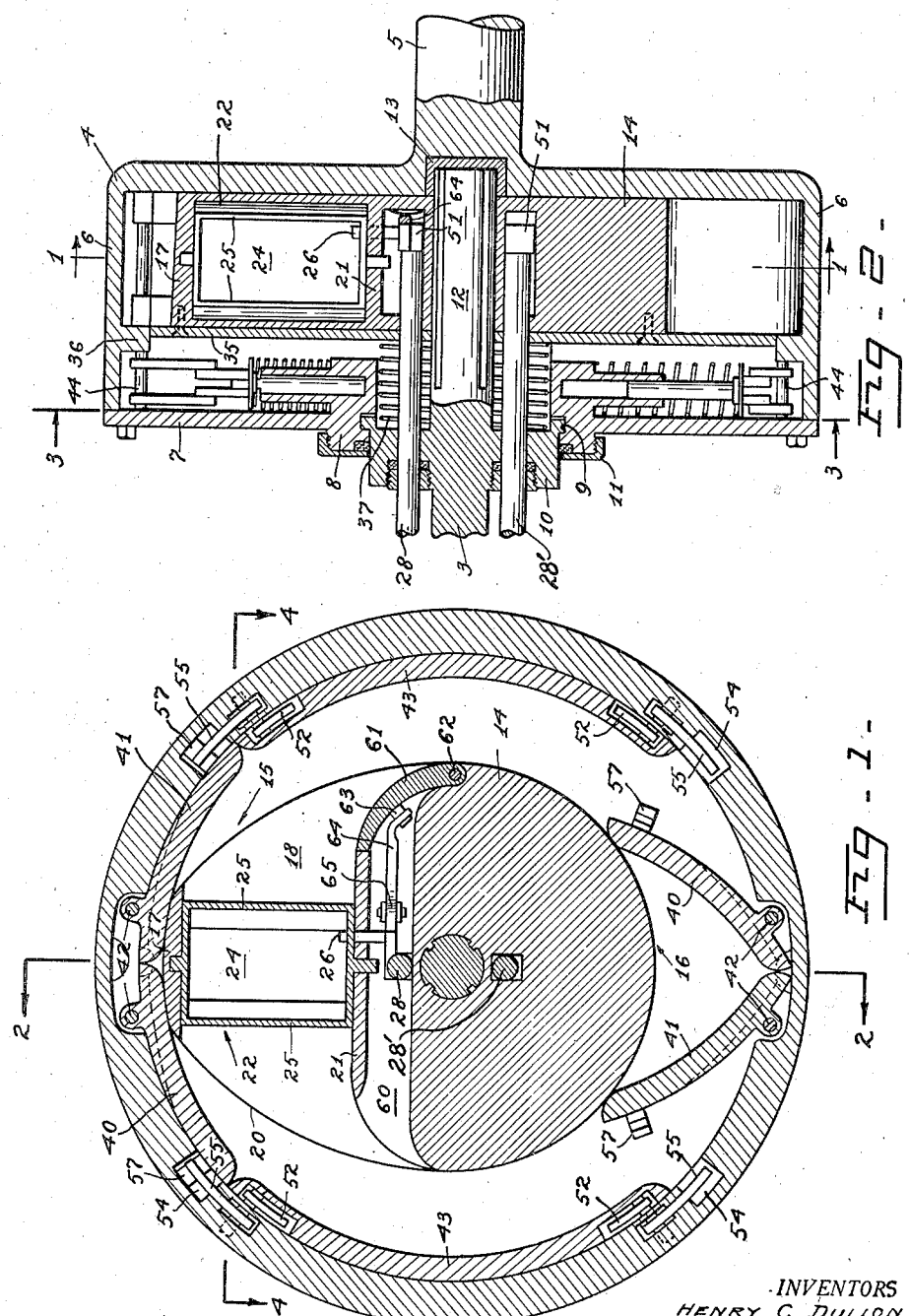

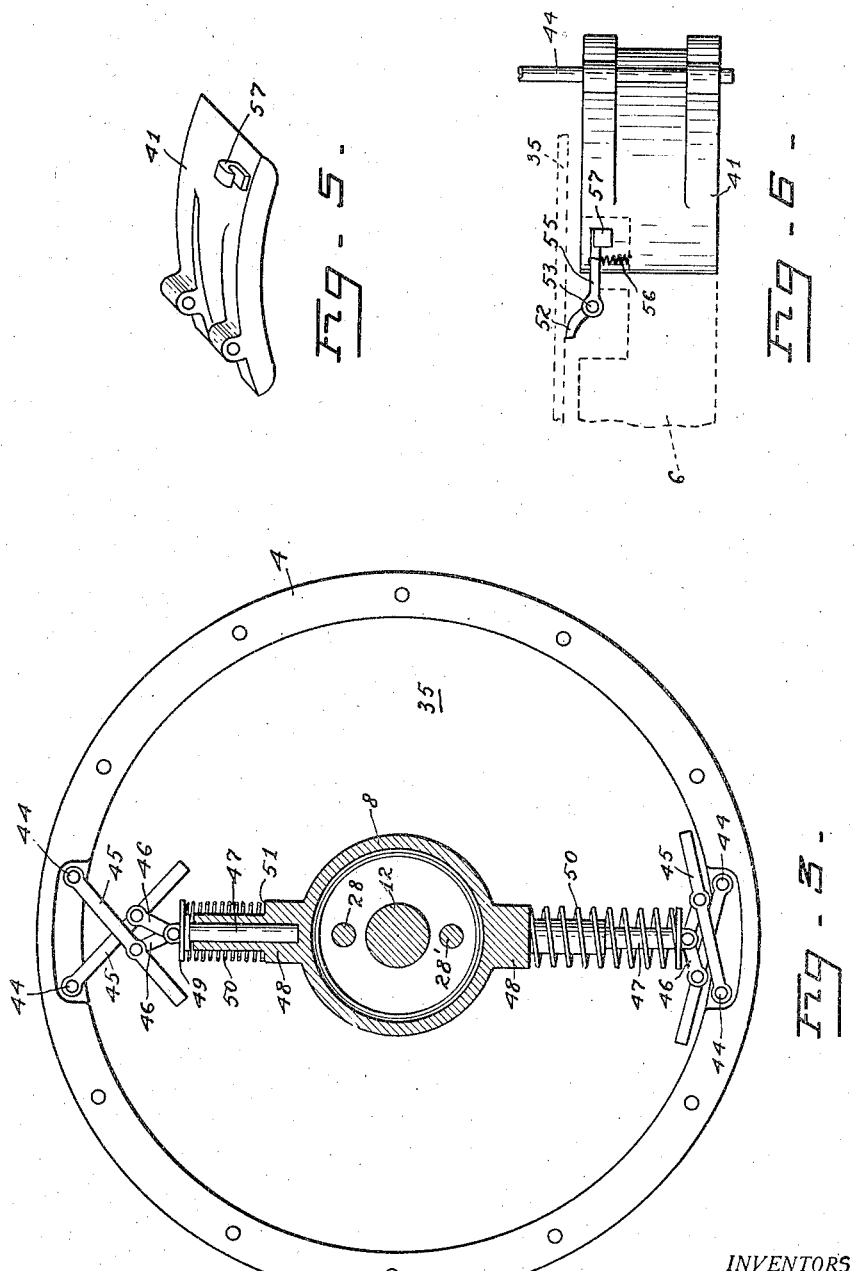

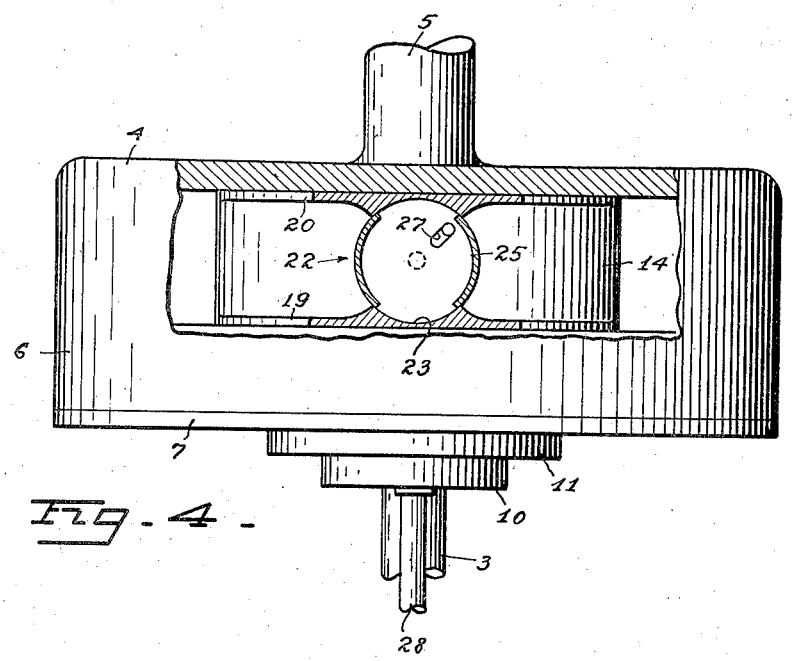
Fig. 4.
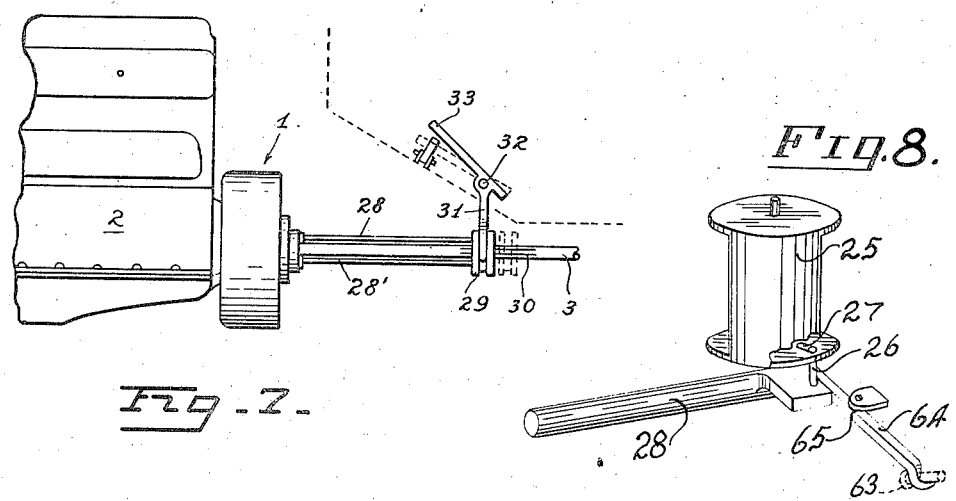
Fig. 7.
Fig. 8.
INVENTORS
HENRY C DULION
CHARLES R MURPHY
BY
ATTORNEY Patented Jan. 10, 1939

UNITED STATES PATENT OFFICE 2,143,238

VARIABLE SPEED TRANSMISSION

Henry C. Dulion and Charles R. Murphy, Oakland, Calif.

Application October 10, 1934, Serial No. 747,752

7 Claims. (Cl. 192—58)

This invention relates particularly to a variable speed hydraulic transmission to be interposed between driving and driven members.

An object of the invention is to provide a variable speed transmission to function as a coupling agent between the engine of an automotive vehicle and the wheel propelling shaft of said vehicle.

A further object of the invention is to provide a variable speed hydraulic transmission consisting of a stator and a rotor, together with cooperating elements between the stator and rotor to effect movement of the rotor ranging from zero R. P. M. to the same R. P. M. as that of the stator.

A still further object of the invention is to provide a variable speed hydraulic transmission wherein the driven shaft may be rotated at the same or lesser R. P. M. as that of the driving member, as well as means for automatically rendering the transmission inoperative when the speed of rotation of the driven member exceeds the speed of rotation of the driving member.

Other objects and advantages are to provide a variable speed hydraulic transmission that will be superior in point of simplicity, inexpensiveness of construction, positiveness of operation, and facility and convenience in use and general efficiency.

In this specification and the annexed drawings, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

In the accompanying three sheets of drawings:

Fig. 1 represents a cross section through a variable speed hydraulic transmission constructed in accordance with our invention taken on the line 1—1 of Fig. 2.

Fig. 2 is a cross section taken through Fig. 1 on the line 2—2.

Fig. 3 is an elevation partly in section taken on the line 3—3 of Fig. 2.

Fig. 4 is a plan view of Fig. 1 partly broken away to show the control valve therein.

Fig. 5 is a perspective view of one of the gates.

Figure 6 is an elevation of one of the gates showing an associated latch device.

Fig. 7 is a diagrammatic view showing the variable speed transmission interposed between a driving member and a driven member.

Fig. 8 is a diagrammatic view showing the valve assembly operating structure.

In detail the construction illustrated in the drawings comprises a variable speed hydraulic transmission generally designated by the numeral 1, one element of which is operatively connected to the crank shaft or driving member of the engine 2, while the rotor portion of the transmission is connected to the driven or wheel propelling shaft 3.

The transmission 1 consists of a cylindrical casing 4, having a shaft 5 on the outside of one side thereof connected to the engine or prime mover 2. The element 4 is provided with an extended circumferential wall 6 concentric with the axis thereof. A plate or cover 7 is bolted or otherwise fixedly secured over the open end of the element 4. The cover 7 is provided with a hole therein, concentric with the axis of the element, around which a hub 8 is formed. The hub 8 is provided with an annular recess 9 therein, within which an annular shoulder 10 on the driven shaft 3, is adapted to be confined. A lock nut 11 is provided on the outside of the plate 7 to seat against the shaft shoulder 10 and hold the same snugly in engagement with the hub 8. The driven shaft 3 is provided with an extension 12 thereon, within the element 4, the end of which extension is journaled at 13 in the end wall of the element 4.

An oval or substantially egg-shaped rotor 14 is slidably splined or keyed to the shaft 12 within the element 4. The longer radial dimension 15 of the rotor 14 prescribes an arc of travel adjacent to the circumferential wall 6 of the element 4, while the shorter radial dimension 16 of the rotor has an arc of travel which is a substantial distance away from the inner circumference of the wall 6.

The portion 16 of the rotor, in operation, functions as a counterbalance for the opposite portion 15 of said rotor. The longer radial portion of the rotor between the shaft 12 and the periphery 17 thereof, is cut away at 18 throughout the body thereof, to leave this portion of the rotor comprised of the opposite side walls 19 and 20 connected together across the top thereof by the wall 17, and at the bottom by the wall 21.

A circular valve 22 is arranged radially within the hollowed out portion 18 of the rotor, the opposite ends of the valve 22 being journaled in the outer wall 17 and the inner wall 21 of said rotor. The opposite side walls 19 and 20 of the rotor facing the valve 22, are formed on an arc 23, corresponding to the outer circumference of the valve 22. The valve 22 is provided with vertically disposed openings 24 extending the length thereof on diametrically opposite sides thereof, through which either oil or fluid pressure may flow from one side of the rotor, thru the cut out portion 18 in the rotor, to the other side of said rotor. The wall portions 25 of the valve 22 are of a width which is slightly greater than the distance between the opposite side walls of the rotor, whereby the portions 25 may completely block off the passage through the hollowed out portion 18 of the rotor.

The valve 22 is oscillated or turned on its longitudinal axis by means of a pin 26, which pin is slidably confined in a diagonally disposed slot 27 in the base of the valve 22, and the bottom wall 21 of the rotor. The pin 26 is mounted on a shaft 28 which lies parallel to the axis of the driven shaft 3 and extends outwardly through the shoulder 10 on said shaft into engagement with a collar 29 slidably splined at 30 on the driven shaft 3.

A shifting fork 31 is pivoted at 32 on the vehicle frame, and said fork engages the collar 29 for moving the same axially on the shaft 3. The shifting fork 31 is provided with a foot pedal 33 thereon, for convenience of operation by the foot of the vehicle operator. Thus swinging movement of the foot pedal 33 causes axial movement of the collar 29 and the shaft 28, whereby lengthwise movement of the shaft 28 through the pin 26 causes oscillating or rotative movement of the valve 22 to cover and uncover the opening through the center of the rotor.

A plate 35 is mounted on the rotor within the element 4, the circumference of said plate 35 engaging an annular shoulder 36 around the inner wall of the element 4. The plate 35 slides with the rotor on the driven shaft 3, and has an opening therein through which the shaft 28 extends.

The side face 20 of the rotor is adapted to lie against the rear face of the element 4, while the opposite side face 19 of the rotor is adapted to lie against the plate 35. An expansion spring 37 is mounted around the shaft 3 to expand against the plate 35 and rotor and force the same tightly against the end wall of the element 4. The pressure of the spring is sufficient to hold the plate and rotor against the element 4 to form a fluid or pressure containing area within the space between the rotor and the element 4.

Arcuate gates 40 and 41 are fixedly mounted on the pin 44 at 42 on the circular wall 6 of the element 4, on opposite sides thereof. The thickness of the gates 40 and 41 corresponds to the thickness between the outer circumference of the longer dimension 15 of the rotor and the inner circumference of the wall 6. The arc of the circumference of the inner wall of the element 4 between the free ends of the gates 41 and 40 is filled by the curved plates 43 which are of a thickness identical with that of the gates 40 and 41. The upper end 17 of the rotor will thus move smoothly around on the curved surface provided on the inner circumference of the wall 6, by the gates 40 and 41 and the filler pieces 43. The pivot 42 of each of the gates 40 and 41 consists of a pin 44, which is journaled in and extends beyond the annular shoulder 36 provided on the peripheral wall 6 of the element 4.

The gates 40 and 41 are adapted to be maintained in contact with the outer face of the rotor at times, and at other times to be held in flush continuation with the filler pieces 43. When it is desired to render the transmission operative and to obtain variable speeds of rotation therefrom, the free ends of the gates 40 and 41 must engage and follow the outer face of the rotor. This is accomplished by providing an arm 45 fixed on the end of each pivot pin 44, and pivotally connecting an intermediate portion of said arm by a link 46 to a plunger 47 reciprocatingly confined in a guide bearing 48, there being one of said guide bearings 48 on diametrically opposite sides of the hub 8 formed in the cover plate 7.

A disc 49 is mounted on the upper end of the plunger 47, and an expansion spring 50 is interposed between the disc 49 and a shoulder 51 on the outside of the guide bearing 48. The action of the spring 50 expanding against the disc 49, causes the links 46 and arms 48 to assume a position which will cause the free ends of the gates 40 and 41 to swing inwardly away from the inner wall of the element 4 and into contact with the outer wall of the rotor as shown in the lower portions of each of the Figs. 1, 2 and 3. Where the periphery of the rotor causes the gates 40 and 41 to lie against the inner wall of the element 4, the links 46 and arms 45 assume the position shown in the upper portion of Figs. 2 and 3.

In order to operate the transmission, the entire space between and within the element 4 and the rotor, is filled with oil or some other fluid medium. The opposite portions of the gates 40 and 41 are allowed to swing out to engage the outer periphery of the rotor. The element 4 being directly coupled to the engine 2, rotates in unison therewith, while the rotor, due to the inertia of the propeller shaft to which it is connected, remains in a stationary position, if it be assumed that the valve 22 is in the normally closed position.

To effect a disengagement of the drive and driven members on depression of pedal 33, (Fig. 7) rod 28 is thereby moved to the left in Fig. 2 to open valve 22. Thereafter to render the transmission completely neutral, pedal 33 would be fully depressed whereby the enlargement 51 on rod 28' (Fig. 2) engages the shoulder at the left end of its bore (due to the rod being moved further to the left in the figure) to move the rotor 14 and its plate 35 also to the left. This movement of the plate 38 permits latches 55 (Fig. 6) to be moved by their springs 56 to engage and thereby maintain gates 40, 41 in their outmost position after being so moved by the projecting portion of rotor 14.

In order to cause the rotor to rotate, after a disengagement of the transmission has been effected, the operator gradually releases the pedal 33 thereby permitting the gradual oscillation or turning of the valve 22 until said valve closes off the opening through the rotor and builds up an immovable body of fluid between the valve 22 in the rotor and the respective gates 40 and 41. When the wall portions of the valve 22 completely close off the port or passage 18 through the rotor, the body of fluid confined between opposite sides of the valve 22 and the gates 40 and 41 cannot move or circulate, and hence tightly binds the element 4 and rotor together causing the rotor to turn in synchronism with the element 4 in a clockwise direction. Thus the propeller shaft of the vehicle will be driven at direct or engine speed.

In order to move the rotor at speeds less than that of the element 4, a slippage action is created between the element 4 and rotor by opening the valve 22, whereby the fluid confined between opposite sides of the valve 22 and the gates 40 and 41 may by-pass therethrough. The amount of retardation placed on the fluid which may pass through the valve 22, can be regulated to any desirable degree by the foot pedal 33, so that rotative speeds of the rotor and of the driven shaft 3, varying from zero to that of the speed of the element 4 may be obtained.

When the valve 22 is in the fully opened position, the rotor remains inoperative relative to the element 4. However, in view of the fact that the openings through the valve 22 might possibly restrict the circulation of the fluid medium therethrough, and not render the transmission completely neutral, it may be found desirable to free the fluid within the element 4 which we accomplish by axial movement of the bar 28, together with movement of a companion bar 28' through the agency of squared ends 51 on said rods, to move the rotor and the plate 35 axially on the shaft 12 against the expansion of the spring 37, thereby to temporarily destroy the space between the rotor and the element 4 within which fluid pressure may be accumulated. In moving the bars 28—28' to impart axial movement to the plate 35 and rotor, the valve 22 is placed in the fully closed position.

Looking at Fig. 2, the squared ends of the rods 28—28' would move the rotor and the plate 35 toward the left, thus enlarging the fluid capacity of the area in which the fluid is confined to an extent that no binding effect could be obtained between the rotor and the element 4.

When the rotor and the plate 35 are moved axially on the shaft 12, the face of the plate 35 moves away from a plurality of arms 52, each of which are fixed on a pin 53 journaled in a recess 54 in the annular shoulder 36 upon the inner circumference of the element 4. A latching element 55 is fixed on each shaft 53, and said latching element is adapted to be pulled by a tension spring 56 into engagement with a latching plate 57 on the bottom side of each of the gates 40 and 41. When the rotor and plate 35 are moved into the spread or opened position, rotative movement of the rotor causes the gates 40 and 41 to be swung back against the inner circumference of the element 4 and there locked automatically by the latching member 55 engaging the latching plate 57. When the bars 28—28' are released to relieve the separating movement of the rotor and the plate 35, the tension spring 37 causes the plate and rotor to be moved into the assembled position, during which action the plate 35 automatically moves into contact with the members 52, thereby causing the latching elements 55 to be disengaged from the latch plates on the gates 40 and 41, so that the free end of said gates may swing out into contact with the periphery of the rotor.

The foot pedal 33 swings within a certain definite arc, the length of travel of which is sufficient to manipulate the control valve 22 from the fully closed to the fully opened positions, and vice versa. We desire, however, that ceratin additional swinging movement of the pedal 33 beyond that necessary for normal operation of the transmission be used for actuating the said transmission when it is desirous of obtaining a free wheeling effect. This free wheeling effect is accomplished by providing a passage 60 through the rotor, thereby to communicate the space on opposite sides of the said rotor. The passage 60 is closed at one end by a gate 61, said gate being pivoted to the rotor at 62. The gate 61 is held in the closed position by means of a latch pin 63 thereon, being engaged by a latching member 64 pivoted within the passage 60 at 65. The latching member 64 is unlatched by axial movement of the bar 28. Whenever the free wheeling effect is not desired, the heel portion of the pedal 33 is raised to disengage the bar 28 from the latch 64, whereby the pressure developed against the outside of the gate 61 will automatically force it into the closed position, in which position it will be held locked by the latch plate 63 and latching element 64.

Since the free wheeling effect is usually obtained while the clutch is in complete engagement it follows that valve 61 (Fig. 1) should be open while valve 22 is maintained closed. Hence this is effected by raising the toe or left end of pedal 33 (Fig. 7) from the full line position shown, thereby depressing the heel or rear portion of the pedal. This moves rods 28, 28' to the left in Fig. 7 and to the right in Fig. 2, to cause rod 28 to bear against lever 64 to release a pin 63 on valve 61 from the lever 64. Valve 61 then of course is opened by fluid pressure due to the reversal of relative rotation between rotor 14 and casing 4.

Having thus described our invention what we claim and desire to secure by Letters Patent is:

1. A variable speed transmission including a casing and rotor revolvably associated with each other; means connecting said casing to a driving element; means connecting said rotor to a driven element, said rotor having an eccentric portion thereon; a valve in the eccentric portion of said rotor to control the flow of a fluid from one side of said rotor to the other and to thereby effect the same or different speeds of rotation between the casing and the rotor; means extending through said casing for controlling the position of said valve in the rotor.

2. A variable speed transmission including a casing and rotor revolvably associated with each other; means connecting said casing to a driving element; means connecting said rotor to a driven element, said rotor having an eccentric portion thereon; a valve in the eccentric portion of said rotor to control the flow of a fluid from one side of said rotor to the other and to thereby effect the same or different speeds of rotation between the casing and the rotor; gates pivotally mounted on the inner circumference of said stator in bearing contact with the outer face of said rotor; means to lock said gates against the inner circumference of said casing.

3. A variable speed transmission comprising a hollow casing; means connecting said casing to a driving element; a shaft journalled in said casing and connected to a driven element; a rotor slidably splined on said shaft, said rotor having an eccentric portion on one side thereof in contact with the inner circumference of said casing and said eccentric portion of said rotor having a fluid passage therethrough; a valve journalled in the rotor; means to move said valve to regulate the flow of fluid through said passage and to thereby effect the same and different speeds between the casing and rotor; and gates pivotally mounted on the inner circumference of said casing in bearing contact with the outer face of said rotor.

4. A variable speed transmission comprising a hollow casing; means connecting said casing to a driving element; a shaft journalled in said casing and connected to a driven element; a rotor slidably splined on said shaft, said rotor having an eccentric portion on one side thereof in contact with the inner circumference of said casing and said eccentric portion of said rotor having a fluid passage therethrough; a valve journalled in the rotor; means to move said valve to regulate the flow of fluid through said passage and to thereby effect the same and different speeds between the casing and rotor; and gates pivotally mounted on the inner circumference of said casing in bearing contact with the outer face of said rotor; means to maintain said gates in frictional contact with said rotor.

5. A variable speed transmission comprising a hollow casing; means connecting said casing to a driving element; a shaft journalled in said casing and connected to a driven element; a rotor slidably splined on said shaft, said rotor having an eccentric portion on one side thereof in contact with the inner circumference of said casing and said eccentric portion of said rotor having a fluid passage therethrough; a valve journalled in the rotor; means to move said valve to regulate the flow of fluid through said passage and to thereby effect the same and different speeds between the casing and rotor; and gates pivotally mounted on the inner circumference of said casing in bearing contact with the outer face of said rotor; means to maintain said gates in frictional contact with said rotor at times; and means to lock said gates against the inner circumference of said casing at other times.

6. A variable speed transmission comprising a hollow casing; means connecting said casing to a driving element; a shaft journalled in said casing and connected to a driven element; a rotor slidably splined on said shaft, said rotor having an eccentric portion on one side thereof in contact with the inner circumference of said casing and said eccentric portion of said rotor having a fluid passage therethrough; a valve journalled in the rotor; means to move said valve to regulate the flow of fluid through said passage and to thereby effect the same and different speeds between the casing and rotor; and gates pivotally mounted on the inner circumference of said casing in bearing contact with the outer face of said rotor; and means to move said rotor axially relative to the casing to permit unobstructed rotation of the casing relative to the rotor and vice-versa.

7. A variable speed transmission comprising a hollow casing; means connecting said casing to a driving element; a shaft journalled in said casing and connected to a driven element; a rotor slidably splined on said shaft, said rotor having an eccentric portion on one side thereof in contact with the inner circumference of said casing and said eccentric portion of said rotor having a fluid passage therethrough; a valve journalled in the rotor; means to move said valve to regulate the flow of fluid through said passage and to thereby effect the same and different speeds between the casing and rotor; and gates pivotally mounted on the inner circumference of said casing in bearing contact with the outer face of said rotor; and a secondary valve through said rotor and by-passing through said rotor from one side thereof to the other independently of the first mentioned valve.

HENRY C. DULION.
CHARLES R. MURPHY.